Patented Feb. 18, 1936

2,030,883

UNITED STATES PATENT OFFICE 2,030,883

PRECIPITATION OF MIXED ESTERS OF CELLULOSE

Carl J. Malm, Rochester, N. Y., assignor to Eastman Kodak Company, Rochester, N. Y., a corporation of New York No Drawing. Application July 28, 1931,
Serial No. 553,647

5 Claims. (Cl. 260—102)

This invention relates to the recovery of the higher esters of cellulose, especially from reaction mixtures in which the cellulose esters are formed and dissolved, by precipitating the ester from its reaction mixture by means of an acid solution of more than 50% concentration and maintaining the acid in the solution at a fairly constant concentration throughout the precipitation.

It is well known to precipitate cellulose esters from their reaction mixtures by pouring water into the mixtures until the acid concentration is reduced so that it will not retain the ester in solution and the ester is precipitated. However, due to the condition of the precipitated material after that method of separating it from its reaction mixture, it has many disadvantages. The ester when precipitated by pouring the reaction mixture into an excess of water separates in the form of clumps, shreds or fibers which have a horny and highly resistant surface. As a consequence the ester is very difficult to break up and wash free from acid.

Another disadvantage of prior precipitation processes for higher organic esters of cellulose is the excessive dilution of the organic acids by the pouring of the reaction mixture into water. The removal of this excess of water in the subsequent concentration of the recovered acid adds to the costs and procedure necessary in the manufacture of cellulose ester.

One object of the present invention is to provide a process by which a higher ester of cellulose may be recovered from its reaction mass in a form in which it can be easily disintegrated, washed and further treated or dissolved if desired.

Another object of the present invention is to provide a process in which the acids which are contained in the reaction mixture are recovered in a concentrated condition so that they may be employed for many purposes in which an acid of that concentration may be used or they may be further concentrated with a minimum of trouble and expense.

I have found that in the manufacture of the esters of cellulose containing acyl groups of more than two carbon atoms, both simple and mixed, the ester after its formation in the reaction bath may be recovered from the reaction bath in the form of soft particles which can be readily disintegrated and washed by precipitating the ester in a water-acid solution containing over 50% organic acid. It is preferred that the concentration of the precipitating liquid be kept constant throughout the entire precipitating step altho some variation is permissible.

It might be expected that wasteful amounts of the higher cellulose ester would remain in solution in the strong concentration of acid employed in the present process but I have found that the actual loss of the higher ester is negligible unless the concentration of the precipitating liquid is allowed to increase to a strength which obviously would maintain the ester in solution.

As a general rule the concentration of the precipitating liquid is maintained between 50 and 60% acid strength but in most cases a concentration of 50–55% is preferred.

The esters which may be separated from their reaction mixtures are any of the esters of cellulose containing acyl groups of more than two carbon atoms such as cellulose acetate-propionate, cellulose acetate-butyrate, cellulose propionate and cellulose butyrate as well as the esters of the still higher organic acids such as cellulose acetate-stearate. Some of the esters which may be precipitated from their reaction mixtures are disclosed in U. S. patents to Clarke and Malm, Numbers 1,698,048, 1,735,159 and 1,800,860, all of which describe various higher organic esters of cellulose and methods of producing them.

The following examples are illustrative of the application of my invention to the separation of some of the higher organic esters from their reaction mixtures.

*Example I*

A solution of cellulose acetate-propionate containing about 850 lbs. of cellulose acetate-propionate dissolved in 2500 lbs. of substantially anhydrous propionic acid and 4000 lbs. of substantially glacial acetic acid may be diluted with 4000 lbs. of a mixture of 50% water, 20% propionic acid and 30% acetic acid with agitation. The precipitation liquid filtered off from the precipitation of the previous batch has approximately the proportions of the diluting liquid and it is preferred that the previous precipitation liquid be employed for this dilution.

The diluted dope is then poured with rather vigorous stirring into an aqueous acid solution of about the same composition as the dilution liquid referred to above. While the dope is being added to the precipitating liquid, water is also added at a rate sufficient to keep the concentration of the precipitation liquid between about 50-55%. This rate can readily be calculated with respect to the concentrations chosen.

A precipitate is obtained which can be readily washed and filtered and in which difficultly disintegrable material is absent. The product obtained may then be purified by counter-current washing and boiling with distilled water as disclosed in the Clarke and Clarke application Serial No. 540,108 filed May 26, 1931.

*Example II*

A reaction solution of cellulose butyrate containing about 1000 lbs. cellulose butyrate dissolved in 2300 lbs. of butyric acid and 5000 lbs. of monochloracetic acid is diluted with 4500 lbs. of a mixture of 50% water and 50% monochloracetic acid. The diluted reaction mixture is then slowly poured with rather vigorous stirring into an aqueous chloracetic acid solution of about 52% strength, while water is continuously added at a rate to keep the concentration approximately constant. The product may then be refined as disclosed in the preceding example.

The acid obtained from my precipitation process has an acid content of over 50% and contains practically no dissolved cellulosic material. As the proportion for instance of the acetic acid to the propionic acid in the mixture is known, the liquor from the precipitating bath may be concentrated and employed in a subsequent esterification process without the necessity of separating the concentrated acid into its component acids.

The concentrating of the acid may be carried out according to the U. S. patents of H. G. Stone and W. W. Hartman, Nos. 1,908,240 and 1,939,237, which disclose the concentration of the higher fatty acids with ethylene or propylene chloride respectively in which an azeotropic mixture of the alkylene chloride and water is distilled off.

What I claim as my invention:

1. In the process of recovering a mixed organic ester of cellulose from a solution thereof in a lower fatty acid containing liquid the step which comprises precipitating the ester in an aqueous precipitation bath containing 50-60% by weight of mixed lower fatty acids.

2. In the process of recovering an organic acid ester of cellulose containing an acyl group of more than two carbon atoms from a reaction mixture containing it, the steps which comprise the dilution of the reaction mixture with aqueous lower fatty acid to a concentration at which the ester will remain in solution and the vigorous stirring of the solution into an aqueous precipitation bath containing initially at least 50% by weight of a lower fatty acid, the water in said bath being not over 50% throughout the precipitation and separating the precipitate from said bath.

3. In the process of recovering an organic acid ester of cellulose containing an acyl group of more than two carbon atoms from its reaction mixture, the steps which comprise the dilution of the reaction mixture with aqueous lower fatty acid to an acid concentration of about 77% and the vigorous stirring of the mixture into an aqueous precipitation bath containing initially at least 50% by weight of a lower fatty acid, the water in said bath being not over 50% throughout the precipitation and separating the precipitate from said bath.

4. In the process of recovering a mixed ester of cellulose containing both acetyl and acyl groups of 3 to 4 carbon atoms from a solution thereof in a lower fatty acid containing liquid, the step which comprises precipitating the ester in an aqueous precipitation bath containing 50 to 60% by weight of mixed lower fatty acids.

5. In the process of recovering a cellulose acetate propionate from a solution thereof in a lower fatty acid containing liquid, the step which comprises precipitating the ester in an aqueous precipitation bath containing 50 to 60% by weight of mixed lower fatty acids.

CARL J. MALM.